US011949606B2

(12) United States Patent
Cariou et al.

(10) Patent No.: US 11,949,606 B2
(45) Date of Patent: *Apr. 2, 2024

(54) INCREASED UTILIZATION OF WIRELESS FREQUENCY CHANNELS PARTIALLY OCCUPIED BY INCUMBENT SYSTEMS

(71) Applicant: Intel Corporation, Santa Clara, CA (US)

(72) Inventors: Laurent Cariou, Portland, OR (US);
Xiaogang Chen, Portland, OR (US);
Qinghua Li, San Ramon, CA (US);
Robert J. Stacey, Portland, OR (US);
Huaning Niu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,858

(22) Filed: Oct. 24, 2022

(65) Prior Publication Data

US 2023/0110632 A1   Apr. 13, 2023

Related U.S. Application Data

(63) Continuation of application No. 17/041,996, filed as application No. PCT/US2018/037419 on Jun. 13, 2018, now Pat. No. 11,483,838.

(51) Int. Cl.
*H04B 7/0452* (2017.01)
*H04L 5/00* (2006.01)
(Continued)

(52) U.S. Cl.
CPC ......... *H04L 5/0023* (2013.01); *H04B 7/0452* (2013.01); *H04L 5/0048* (2013.01);
(Continued)

(58) Field of Classification Search
CPC .......... H04W 72/0453; H04W 72/042; H04W 72/048; H04W 72/0406; H04W 72/1263;
(Continued)

(56) References Cited

U.S. PATENT DOCUMENTS

2016/0056930 A1   2/2016   Seok
2016/0212246 A1   7/2016   Seok
(Continued)

FOREIGN PATENT DOCUMENTS

JP   2018506893 A   3/2018
WO   2017111567 A3   3/2018

OTHER PUBLICATIONS

Japan Patent Office; Office Action issued in JP Patent Application No. 2020-551548, dated Jul. 20, 2022; 8 pages including English translation.
(Continued)

*Primary Examiner* — Peter Chen
(74) *Attorney, Agent, or Firm* — Alliance IP, LLC

(57) ABSTRACT

A wireless communication device, method and system. The device includes a memory, and a processing circuitry coupled to the memory. The processing circuitry is to: decode at least one signal field portion of a signal field of a Physical Layer Convergence Protocol (PLCP) Data Unit (PPDU) received over a bonded channel, the bonded channel comprising a plurality of subchannels including a punctured subchannel, the signal field portion on at least one unpunctured subchannel of the plurality of subchannels; determine, from the at least one signal field portion, information on a resource allocation for the device, the resource allocation indicating at least one resource unit (RU) used in a data field of the PPDU for the device; and decode a data
(Continued)

field portion of the data field of the PPDU, the data field portion received on a part of the punctured subchannel based on the resource allocation.

19 Claims, 8 Drawing Sheets

(51) Int. Cl.
*H04L 27/26* (2006.01)
*H04W 52/02* (2009.01)
*H04W 72/1268* (2023.01)
*H04W 72/51* (2023.01)
*H04W 84/12* (2009.01)

(52) U.S. Cl.
CPC ..... *H04L 27/2602* (2013.01); *H04W 52/0219* (2013.01); *H04W 52/0229* (2013.01); *H04W 72/1268* (2013.01); *H04W 72/51* (2023.01); *H04L 27/2603* (2021.01); *H04W 84/12* (2013.01)

(58) Field of Classification Search
CPC ......... H04W 72/1268; H04W 72/1273; H04W 72/1278; H04W 72/1284; H04W 72/1289; H04W 72/1294; H04W 72/51; H04W 84/12; H04W 16/14; H04W 52/0229; H04W 52/0219; H04L 27/2602; H04L 27/0006; H04L 5/0094; H04L 5/0023; H04L 5/0048; H04L 5/0064; H04L 1/08; H04B 7/0452
See application file for complete search history.

(56) References Cited

U.S. PATENT DOCUMENTS

| | | |
|---|---|---|
| 2017/0041171 A1 | 2/2017 | Li et al. |
| 2017/0366329 A1* | 12/2017 | Cao ..................... H04L 5/0098 |
| 2019/0141570 A1 | 5/2019 | Verma et al. |
| 2019/0199491 A1* | 6/2019 | Verma .................. H04L 1/0069 |
| 2019/0215037 A1 | 7/2019 | Seok et al. |
| 2019/0238301 A1 | 8/2019 | Verma et al. |
| 2019/0327740 A1 | 10/2019 | Verma et al. |
| 2019/0380117 A1 | 12/2019 | Verma et al. |

OTHER PUBLICATIONS

PCT International Preliminary Report on Patentability issued in PCT/US2018/037419, dated Dec. 24, 2020; 6 pages.
PCT International Search Report and Written Opinion issued in PCT/US2018/037419, dated Mar. 12, 2019; 9 pages.
Stacey, Robert; "Specification Framework for TGax," IEEE P802.11 Wireless LANs; Jan. 28, 2016; 50 pages.

* cited by examiner

FIG. 6

602 — encoding a Physical Layer Convergence Protocol (PLCP) Data Unit (PPDU) to be transmitted over a bonded channel, the bonded channel comprising a plurality of subchannels including a punctured subchannel, wherein:

the PPDU includes a signal field and a data field, the signal field including signal field portions carrying information on resource allocations for at least one wireless station (STA) addressed by the PPDU, the resource allocations indicating resource units (RUs) used in the data field for the at least one STA, the signal field portions encoded on unpunctured subchannels of the plurality of subchannels;

the data field includes first data field portions on the respective unpunctured subchannels, and at least one second data field portion on a part of the punctured subchannel; and a signal field portion of the respective signal field portions includes a resource allocation for a STA of the at least one STA indicating at least one RU used in the at least one second data field portion within the punctured secondary subchannel 604 — generating a signal to cause transmission of the PPDU over the bonded channel

US 11,949,606 B2

INCREASED UTILIZATION OF WIRELESS FREQUENCY CHANNELS PARTIALLY OCCUPIED BY INCUMBENT SYSTEMS

CROSS-REFERENCE TO RELATED APPLICATIONS

This application is a continuation of U.S. patent application Ser. No. 17/041,996, filed on Sep. 25, 2020, now issued U.S. Pat. No. 11,483,838, which is a national stage application under 35 U.S.C. § 371 of PCT International Application Serial No. PCT/US2018/037419, filed on Jun. 13, 2018, and entitled INCREASED UTILIZATION OF WIRELESS FREQUENCY CHANNELS PARTIALLY OCCUPIED BY INCUMBENT SYSTEMS. The disclosures of these prior applications are considered part of and are hereby incorporated by reference in their entirety in the disclosure of this application.

TECHNICAL FIELD

The instant disclosure pertains to wireless networks and wireless communications, including wireless local area networks (WLANs) and Wi-Fi networks such as networks operating in accordance with the Institute of Electrical and Electronics Engineers (IEEE) 802.11 family of standards. Aspects of the instant disclosure relate to IEEE 802.11ax.

BACKGROUND

Efficient use of the resources of a wireless local-area network (WLAN) is important to provide bandwidth and acceptable response times to the users of the WLAN. However, often, there are many devices trying to share the same resources and some devices may be limited by the communication protocol they use or by their hardware bandwidth. In some situations, incumbent systems (e.g., satellites or fixed wireless backhaul devices) may use a portion of the bandwidth of a frequency channel to be used by the WLAN.

BRIEF DESCRIPTION OF THE DRAWINGS

The present disclosure is illustrated by way of example and not limitation in the figures of the accompanying drawings, in which like references indicate similar elements and in which:

FIG. 6 illustrates a method to be performed at an AP according to some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
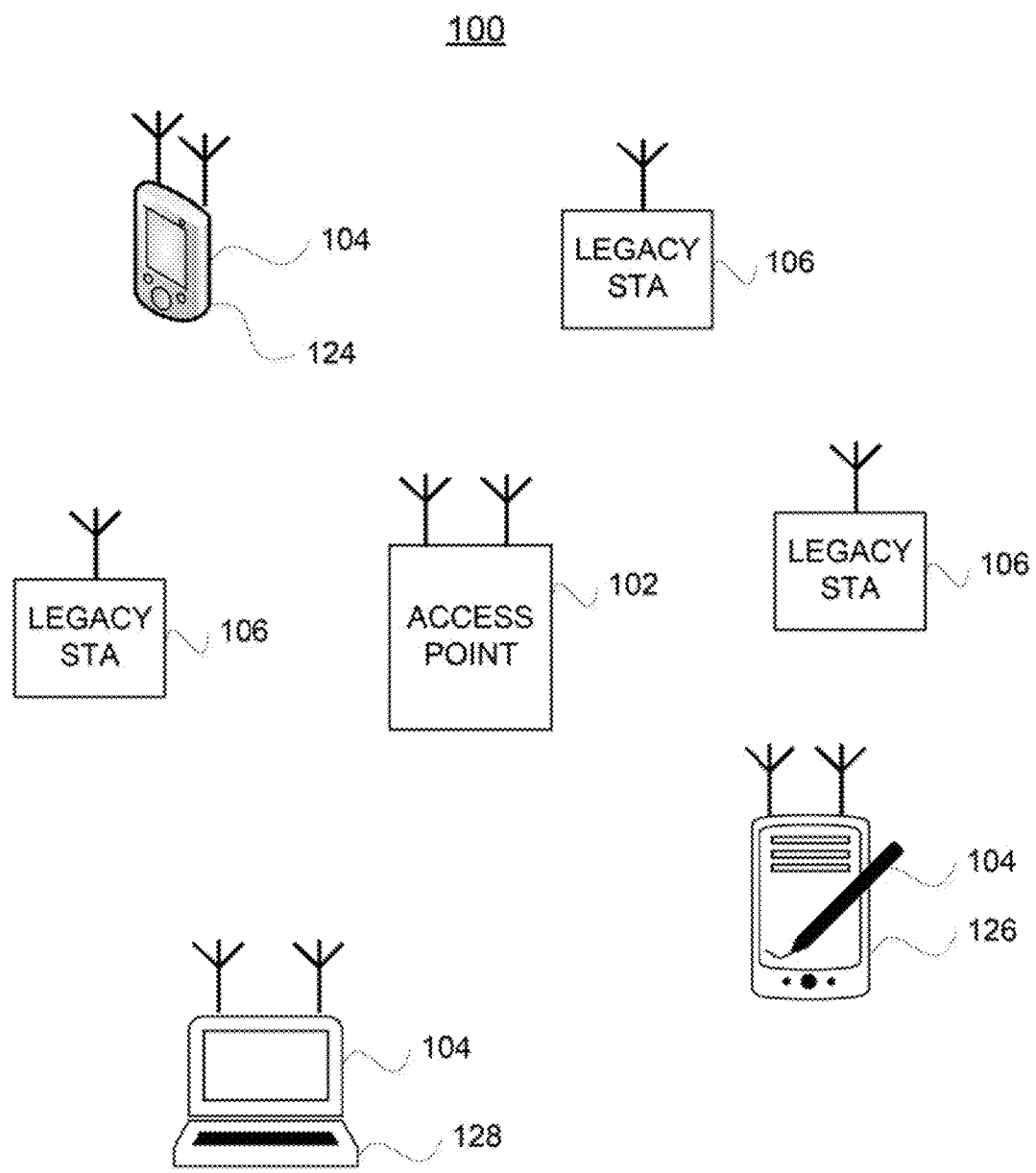
FIG. 1 illustrates a WLAN according to some embodiments.

FIG. 1 illustrates a WLAN 100 in accordance with some embodiments. The WLAN may comprise a basic service set (BSS) that may include an access point (AP) 102, a plurality of high-efficiency (HE) (e.g., IEEE 802.11ax) stations (STAs) 104, and a plurality of legacy (e.g., IEEE 802.11n/ac) STAs 106. As used herein, IEEE 802.11ax may refer to one or more of IEEE P802.11ax/D2.2, earlier 802.11ax specification, or later 802.11ax specification).

The AP 102 may use one of the IEEE 802.11 protocols to transmit and receive. The AP 102 may also include a base station. The AP 102 may use other communications protocols as well as the IEEE 802.11 protocol. The IEEE 802.11 protocol may be IEEE 802.11ax. Use of the IEEE 802.11 protocol may include using orthogonal frequency division multiple-access (OFDMA) and multi-user multiple-input multiple-output (MU-MIMO). The AP 102 and/or HE STA 104 may use one or both of MU-MIMO and OFDMA. More than one AP 102 may form part of an extended service set (ESS). A controller (not illustrated) may store information that is common to the more than one AP 102. The controller may have access to an external network such as the Internet.

The legacy STAs 106 may operate in accordance with one or more of IEEE 802.11 a/b/g/n/ac/ad/af/ah/aj, or another legacy wireless communication standard. The HE STAs 104 may be wireless transmit and receive devices such as cellular telephones, smart telephones, handheld wireless communication devices, wireless glasses, wireless watches, wireless personal devices, tablets, or other devices that may transmit and receive wireless data. In some embodiments, an HE STA may transmit and receive data using an IEEE 802.11 protocol, such as IEEE 802.11ax. In FIG. 1, one of the HE STAs 104 is depicted as a smartphone 124, another as a tablet 126, and another as a laptop computer 128 by way of example. The three HE STAs 104 in FIG. 1 may also be referred to herein as STAs 124, 126 or 128. One or more illustrative HE STAs 104 may be operable by one or more user(s). A HE STA 104 (e.g., 124, 126, or 128) may include any suitable processor-driven STA including, but not limited to, a desktop STA, a laptop STA, a server, a router, a switch, an access point, a smartphone, a tablet, wearable wireless device (e.g., bracelet, watch, glasses, ring, etc.) and so forth. In some embodiments, the HE STAs 104, AP 102, and/or legacy STAs 106 may be termed wireless communication systems. In some embodiments, the HE STA 104 may be a "group owner" (GO) for peer-to-peer modes of operation where the HE STA 104 may perform some operations of an AP 102.

The AP 102 may communicate with legacy STAs 106 in accordance with legacy IEEE 802.11 communication techniques. In example embodiments, the AP 102 may also be configured to communicate with HE STAs 104 in accordance with legacy IEEE 802.11 communication techniques.

In some embodiments, a HE frame may be configurable to have the same bandwidth as a channel. The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments, the bandwidth of the channels may be based on a number of active subcarriers in the frequency domain. For example, the bandwidths of the channels may include multiples of 26 (e.g., 26, 52, 104, 242 etc.) active subcarriers or tones that are spaced within 20 MHz of bandwidth. In some embodiments, the bandwidth of the channels may include 256 tones within 20 MHz. In some embodiments, a 20 MHz channel may comprise 256 tones for a 256-point Fast Fourier Transform (FFT). In some embodiments, a different number of tones may be used. In some embodiments, the OFDMA structure may include a 26-subcarrier resource unit (RU), 52-subcarrier RU, 106-subcarrier RU, 242-subcarrier RU, 484-subcarrier RU or a 996-subcarrier RU, or a combination of the above. In some embodiments, resource allocations for a single user (SU) may include a 242-subcarrier RU, 484-subcarrier RU, 996-subcarrier RU or a 2×996-subcarrier RU.

An RU corresponds to a bandwidth allocation including a number of subcarriers (i.e., tones) defined in the frequency domain that may be allocated for a transmission. In some embodiments, an RU may correspond to the smallest subchannel that may be assigned to a particular STA for a particular transmission. The HE STAs 104 may be assigned RUs by the AP, or they may randomly access the operating channels. With respect to the RUs, for example in a channel having a frequency band of 20 MHz, there may be a total of 9 RUs, each having a particular number of tones (e.g., 26, 52, 106, etc.). The RUs may be modulated to include preamble data and payload data transmitted between an AP and a STA.

A HE frame may include a number of spatial streams, which may be in accordance with MU-MIMO techniques. In some embodiments, a HE frame may be configured in accordance with one or both of OFDMA and MU-MIMO. In some embodiments, the AP 102, HE STA 104, and/or legacy STA 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, WiMAX, WiGig, or other technologies.

Some embodiments relate to HE communications. In accordance with some IEEE 802.11ax embodiments, an AP 102 may be arranged to contend for a wireless medium (e.g., during a contention period) to receive exclusive control of the medium for a transmission opportunity (TXOP). The AP 102 may transmit a HE trigger frame at the beginning of the TXOP. The AP 102 may transmit a time duration of the TXOP and channel information within the trigger frame. During the TXOP, HE STAs 104 may communicate with the AP 102 in accordance with a non-contention based multiple access technique such as OFDMA and/or MU-MIMO. This is unlike conventional WLAN communications in which devices communicate in accordance with a contention-based communication technique, rather than a multiple access technique. During the TXOP, the AP 102 may communicate with HE STAs 104 using one or more HE frames. During the TXOP, the HE STAs 104 may operate on a channel smaller than the operating range of the AP 102, while the legacy stations may refrain from communicating with the AP and set their Network Allocation Vectors (NAVs) accordingly.

In accordance with some embodiments, during the transmission of the trigger frame, the HE STAs 104 may contend for the wireless medium, with the legacy STAs 106 being excluded from contending for the wireless medium. In some embodiments, the trigger frame may indicate an uplink (UL) UL-MU-MIMO and/or UL OFDMA control period. In some embodiments, the trigger frame may indicate one or more portions of the TXOP that are contention based for some HE STA 104 and one or more portions of the TXOP that are not contention based.

In example embodiments, the HE STA 104 and/or the AP 102 are configured to perform the methods and operations herein described in conjunction with FIGS. 1-8. The term Wi-Fi may refer to one or more of the IEEE 802.11 communication standards. AP and STA may refer to HE access point 102 and/or HE STA 104 as well as legacy STAs 106. In some embodiments, the HE STAs 104 and AP 102 can include one or more computer systems similar to that of the example machine/systems of FIGS. 5 and 8.

Figure 2:
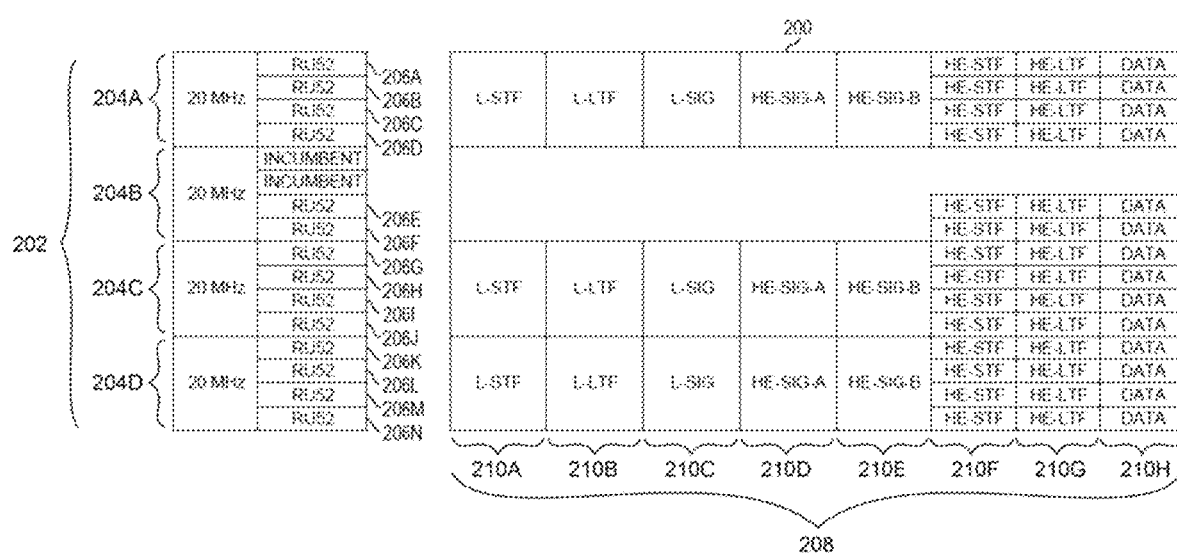
FIG. 2 illustrates a high efficiency (HE) multi user (MU) physical layer protocol data unit (PPDU) sent by the AP of FIG. 1 according to some embodiments.

FIG. 2 illustrates a High Efficiency (HE) Multi User (MU) Physical Layer Convergence Protocol (PLCP) Data Unit (PPDU) 200 sent by the AP of FIG. 1 according to some embodiments. The HE MU PPDU may have any suitable characteristics described in an 802.11ax specification.

In a wireless communication scheme, communication may occur within one or more frequency channels each having a particular bandwidth. For example, a IEEE 802.11 communication standard may utilize channels that each span a 20 MHz band of contiguous frequencies (e.g., in 802.11ax, a channel may occupy 20 MHz in order to maintain compatibility with previous 802.11 standards used by legacy devices). In some embodiments, an AP may utilize multiple 20 MHz channels (which may or may not be contiguous) simultaneously to communicate with STAs 104. For example, a bonded channel 202 may be formed from multiple subchannels 204A-D.

The PPDU 200 of FIG. 2 is communicated by utilizing the bonded channel 202 having a bandwidth of 80 MHz over a time 208. The bonded channel 202 includes four 20 MHz subchannels 204 (i.e., 204A-204D). Each subchannel 204 may include one or more RUs 206. In the embodiment depicted, subchannels 204A, 204C, and 204D each include four RUs 206, with each RU including 52 subcarriers. Other embodiments may utilize bonded channels having different numbers of subchannels and subchannels having different numbers of RUs. In the embodiment depicted, subchannel 204B only includes two RUs due to the usage of a portion of the subchannel 204B by incumbent wireless communication systems (e.g., devices that are not a part of the WLAN 100).

When WLAN 100 operates in a frequency band that allows unlicensed operation (e.g., between 6 GHz and 7 GHz), incumbent wireless communication systems (e.g., satellites, fixed wireless backhaul devices, or other devices) may already be operating in that band. These incumbent systems may occupy various channels within the band and may have a transmission bandwidth ranging, e.g., from a few MHz up to 100 MHz. In general, the WLAN 100 cannot use (i.e., modulate) frequency bands utilized by the incumbent systems due to interference from these devices.

802.11ax defines a mode called preamble puncture, where multiple channels are bonded together (e.g., an 80 MHz channel may comprise four 20 MHz subchannels or a 160 MHz channel may comprise eight 20 MHz subchannels), but one of the secondary 20 MHz subchannels (i.e., a punctured subchannel) is not modulated when it is sensed that that channel is busy (e.g., due to incumbent systems using a portion of the bandwidth of that subchannel). This punctured subchannel may have its tones nulled and no RUs of the punctured subchannel are assigned to STAs.

In the example depicted, subchannel 204B is the punctured subchannel. A portion of the subchannel 204B is occupied by incumbent systems and this busy portion of the subchannel is not used by the WLAN 100 to communicate preamble data or payload data between AP 102 and STAs 104. However, rather than allowing the entire 20 MHz subchannel to go unused in the PPDU as occurs in the typical preamble puncture mode, various embodiments of the present disclosure enable the WLAN 100 to utilize at least a portion of the bandwidth of the punctured subchannel 204B that does not overlap with the frequencies used by the incumbent systems. In a particular embodiment, the scheduling information for this portion of the punctured channel (e.g., data allocating one or more RUs of a punctured subchannel to one or more STAs) may be transmitted in the preamble of one or more subchannels that are not punctured. This embodiment is described in more detail below.

PPDU 200 includes a preamble field (transmitted over times 210A-G) comprising control information and a data field (transmitted over time 210H) comprising payload data. In the embodiment depicted, the preamble field of PPDU 200 includes a Legacy Short Training field (L-STF), a Legacy Long Training field (L-LTF), a Legacy Signal field (L-SIG), a High Efficiency Signal A field (HE-SIG-A), a High Efficiency Signal B field (HE-SIG-B), a High Efficiency Short Training field (HE-STF), and a High Efficiency Long Training field (HE-LTF). The L-SIG, HE-SIG-A, and HE-SIG-B may each be termed signal fields. The L-STF, L-LTF, L-SIG, HE-SIG-A, HE-SIG-B, HE-STF, and HE-LTF fields are transmitted over times 210A, 210B, 210C, 210D, 210E, 210F, and 210G respectively. Each of these fields may include sub-portions transmitted using a part of the channel 202. For example, the L-STF includes a first L-STF sub-portion transmitted by modulating subcarriers of subchannel 204A, a second L-STF sub-portion transmitted by modulating subcarriers of subchannel 204C, and a third L-STF sub-portion transmitted by modulating subcarriers of subchannel 204D. As another example, the HE-STF includes various HE-STF sub-portions that are each transmitted by modulating subcarriers of a single RU 206.

For subchannels 204A, 204C, and 204D, the transmission of an L-STF sub-portion, L-LTF sub-portion, L-SIG sub-portion, HE-SIG-A sub-portion, and HE-SIG-B sub-portion in the respective channel utilize each of the RUs of the respective subchannel. For example, for subchannel 204A, RUs 206A-D are used to transmit an L-STF sub-portion, L-LTF sub-portion, L-SIG sub-portion, HE-SIG-A sub-portion, and HE-SIG-B sub-portion; for subchannel 204C, RUs 206G-J are used to transmit other sub-portions of these fields, and for subchannel 204D, RUs 206K-N are used to transmit yet other sub-portions of these fields. However, because a portion of the bandwidth of subchannel 204B is used by incumbent systems, only RUs 206E and 206F are available for use by the WLAN. Accordingly, subchannel 204B is punctured and consequently L-STF, L-LTF, L-SIG, HE-SIG-A, and HE-SIG-B sub-portions are not transmitted by subchannel 204B.

The HE-STF, HE-LTF, and data field are transmitted over times 210F, 210G, and 210H respectively. Each RU 206 used within the channel 202 is used to transmit a respective set of sub-portions for these fields.

A portion of the preamble of the PPDU 200 may include a legacy preamble comprising the L-STF, L-LTF, and L-SIG. The legacy preamble may be used by legacy STAs 106. L-STF may include information used for coarse synchronization. L-LTF may include information used for fine synchronization and channel estimation. L-SIG may include rate and length information associated with the data field. In various embodiments, sub-portions of the fields of the legacy preamble are duplicated over each subchannel that is not punctured. In a particular embodiment, an L-STF, L-LTF, or L-SIG sub-portion may be transmitted in a single OFDM symbol.

HE-SIG-A includes control information common to HE STAs receiving PPDU 200. This information may be used by the HE STAs to interpret HE PPDUs. A HE-SIG-A sub-portion of a HE MU PPDU may include one or more of: an indication of whether the PPDU is UL or DL, a modulation and coding scheme (MCS) of the corresponding HE-SIG-B sub-portion, an identifier of a basic service set (BSS), spatial reuse information for the PPDU, a bandwidth in which a PPDU is transmitted (e.g., 20 MHz, 40 MHz, 80 MHz, or 160 MHz), an indication of whether preamble puncturing is used, an indication of a punctured subchannel, a number of OFDM symbols of the HE-SIG-B, a length of the HE-LTF, cyclic redundancy check (CRC) information for at least a portion of the HE-SIG-A, or other suitable information.

HE-SIG-B includes information (e.g., OFDMA and DL MU-MIMO resource allocation information) used to interpret one or more data field sub-portions. A HE-SIG-B sub-portion may include a common field and a user specific field (in some situations the common field may be omitted). The common field may include information to be used by all designated STAs to receive the PPDU in the corresponding bandwidth. For example, the common field may include an RU allocation which may specify one or more of RU assignments in the frequency domain, the RUs allocated for MU-MIMO, and the number of users in the MU-MIMO allocations. A user specific field may include information directed to specific STAs. As one example, the user specific field may include zero or more user block fields, and each user block field may include information for two STAs to decode their payloads (with the last user block field including information for either one or two STAs). The user specific field may identify particular STAs (via STA-IDs) and the RUs that are assigned to each STA for a particular PPDU. In various embodiments, the user specific field may include any other suitable information for each STA, such as a modulation and coding scheme (MCSs), a number of spatial streams, spatial configuration information, whether transmit beamforming is used, or other suitable information for a STA. In various embodiments, the HE-SIG-B sub-portion may include the length of a corresponding data field sub-portion.

A HE-STF sub-portion may include information used for coarse synchronization for an HE STA scheduled for the respective RU as well as information to be used by the HE STA to perform automatic gain control (AGC). A HE-LTF sub-portion may include information used for fine synchronization and channel estimation for an HE STA scheduled for the respective RU. A HE-LTF sub-portion may have a variable symbol length in the time domain due to different numbers of possible spatial streams. HE-STF and HE-LTF sub-portions may include information allowing channel estimation to be performed based on a topology defined in a corresponding HE-SIG-A sub-portion and a HE-SIG-B sub-portion.

A data field sub-portion includes the user payload (e.g., a Physical Layer Service Data Unit (PSDU)). The data field sub-portions may also include higher layer headers, such as medium access control (MAC) fields and CRC information.

In various embodiments of the present disclosure, one or more RUs (e.g., 206E and 206F) within a punctured sub-channel 204B may be utilized by the WLAN 100 in spite of the subchannel being operated under a punctured preamble mode. A HE STA that is assigned to an RU in the punctured subchannel may utilize information received via another subchannel in order to decode the data field sub-portion in the RU of the punctured channel. For example, the HE STA may utilize a HE-SIG-A sub-portion (which may be replicated in the other subchannels 204A, 204C, and 204D) to interpret a HE-SIG-B sub-portion from one or more of the non-punctured subchannels and then use information from the HE-SIG-B sub-portion to interpret the data field sub-portion(s) in the punctured sub-channel.

In various situations, information of an HE-SIG-B sub-portion may be duplicated over two or more channels. For example, in an 80 MHz bonded channel that is not operating in a punctured preamble mode, scheduling information for the data field sub-portions of subchannels 204A and 204C may be aggregated and an instance of this information transmitted via a first HE-SIG-B sub-portion on subchannel 204A and a second HE-SIG-B sub-portion transmitted via subchannel 204C, while the scheduling information for the data field sub-portions of subchannels 204B and 204D may be aggregated and an instance of this information transmitted via a third HE-SIG-B sub-portion on subchannel 204B and a fourth HE-SIG-B sub-portion transmitted via subchannel 204D. A similar approach may be taken in the case of a bonded channel operating in a punctured preamble mode, however, a HE-SIG-B sub-portion is not transmitted on the punctured subchannel. Thus, the instance of the scheduling information for the data field sub-portions of subchannels 204B and 204D is only transmitted via subchannel 204D. However, a HE STA may use the information of the HE-SIG-B sub-portion received via subchannel 204D to interpret one or more data field sub-portions transmitted in the RUs of the punctured subchannel 204B (e.g., RU 206E or 206F).

Similarly, in a 160 MHz bonded channel that is not operating in preamble puncture mode, scheduling information for four different subchannels is aggregated, and a separate instance of this information is replicated via the HE-SIG-B sub-portions in each of four channels, while scheduling information for the other four subchannels is aggregated, and a separate instance of this information is replicated via the HE-SIG-B sub-portions in each of the other four channels. In the preamble puncture mode, the punctured subchannel does not transmit a HE-SIG-B sub-portion, but this information may be recovered from one or more of the other three subchannels that include the scheduling information for the data field sub-portions of the punctured subchannel.

Accordingly, by utilizing a HE-SIG-A sub-portion and a HE-SIG-B sub-portion from one or more non-punctured subchannels, a HE STA may interpret the data field sub-portions of a downlink packet transmitted via RUs in a punctured subchannel. Various embodiments may also allow communication over RUs in punctured subchannels in the uplink direction.

Figure 3:
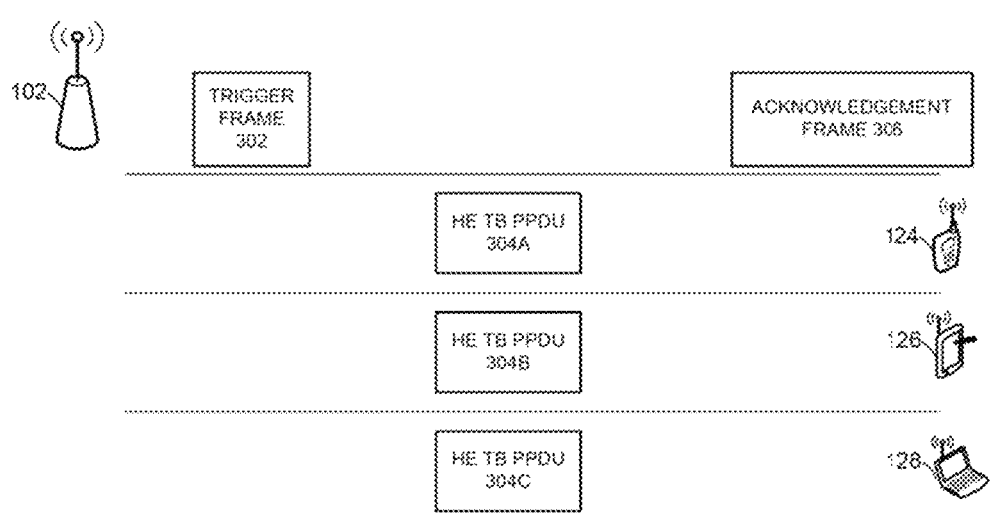
FIG. 3 illustrates communications between the AP and the HE STAs of FIG. 1 in an uplink data flow according to some embodiments.

FIG. 3 illustrates communications between the AP 102 and the HE STAs 124, 126, and 128 of FIG. 1 in an uplink data flow according to some embodiments. IEEE 802.11ax describes a trigger based flow for uplink communications. At 302, the AP broadcasts a trigger frame 302 to HE STAs 124, 126, and 128. The STAs designated in the trigger frame each respond by sending a HE Trigger Based (TB) PPDU 304 (i.e., PPDUs 304A-C) in the uplink direction to the AP 102. The AP 102 then responds with an acknowledgment frame 306.

The trigger frame 302 may be sent to all HE STAs to coordinate uplink MU-MIMO or uplink OFDMA transmissions. The trigger frame 302 may solicit and allocate resources for UL MU transmissions that are to occur a particular amount of time (e.g., a Short lnterframe Space (SIFS)) after the trigger frame 302 is sent. The trigger frame 302 may include information utilized by each HE STA to send its respective HE TB PPDU 304. In a particular embodiment, the trigger frame 302 is within a data field of a HE TB PPDU 304 sent from the AP 102 to the HE STAs.

The trigger frame 302 may include any suitable information, such as an address of a recipient HE STA or a group address if the trigger frame 302 is directed to multiple HE STAs. The trigger frame 302 may also include the address of the sending AP 102.

The trigger frame 302 may include a common info field that provides information that is the same for all responding HE STAs. For example, the trigger frame 302 may include configuration parameters for the HE TB PPDU, such as bandwidth of the HE TB PPDU, the length of the HE TB PPDU, information describing a LTF of the HE TB PPDU, a MU-MIMO LTF Mode, transmission power for each channel, spatial reuse information, or other suitable information.

The trigger frame 302 may also include a user info field for each HE STA that the trigger frame is directed to. A user info field may include an ID of a HE STA, an RU allocation field indicating the RU(s) allocated to the HE STA in the HE TB PPDU, the MCS the HE STA should use in the HE TB PPDU, a target received signal power of the HE TB PPDU, or other suitable information.

As described above, the trigger frame 302 may include scheduling information for the HE STAs for the HE TB PPDUs. In a particular embodiment, the trigger frame may indicate a bandwidth (e.g., 80 MHz or 160 MHz) of the HE TB PPDU along with an indication of a punctured subchannel. The trigger frame may also include a user-info field that schedules a HE STA with an RU allocation that is located in the punctured subchannel (or multiple HE STAs with RU allocations located in the punctured subchannel).

HE STAs identified in the trigger frame 302 may each respond to the trigger frame with a HE TB PPDU that is capable of carrying payload data (e.g., one or more PHY service data units (PPDUs)) for the HE STA. A HE STA that is allocated one or more RUs in a non-punctured subchannel, may respond with an HE TB PPDU that includes field sub-portions that are transmitted over the entire sub-channel as well as field sub-portions that are each transmitted using a single RU allocated to the HE STA. For example, similar to the HE MU PPDU format described above, a HE TB PPDU 304 may include L-STF, L-LTF, L-SIG, and HE-SIG-A sub-portions that are transmitted using an entire subchannel (in that order in the time domain), as well as HE-STF, HE-LTF, and data field sub-portions that are transmitted using a single RU (also in that order in the time domain). These fields may have any suitable characteristics of the corresponding fields described above with respect to the downlink HE MU PPDU.

However, in various embodiments, because the punctured subchannel includes frequencies used by incumbent systems, the sub-portions of the HE TB PPDU (e.g., the L-STF, L-LTF, L-SIG, and HE-SIG-A sub-portions) that would normally be transmitted by the HE STA over the subchannel may be omitted in the punctured subchannel of the HE TB PPDU and only the field sub-portions that are transmitted over the allocated RU(s) in the punctured subchannels (e.g., HE-STF, HE-LTF, and data field sub-portion(s)) are transmitted by the HE STA. The AP 102 is able to interpret the data field sub-portions(s) transmitted by the HE STA based at least in part on the HE-STF and HE-LTF sent in the corresponding RU(s). After waiting a particular amount of time (e.g., a SIFS after transmission of the HE TB PPDUs), an acknowledgement frame 306 indicating reception of the HE TB PPDUs is transmitted to the HE STAs.

Figure 4:
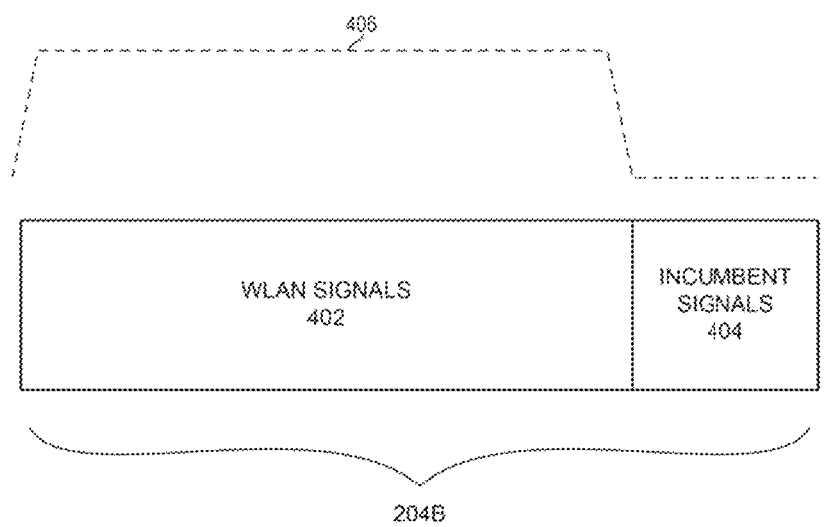
FIG. 4 illustrates a punctured subchannel and a frequency response of a bandpass filter according to some embodiments.

FIG. 4 illustrates a punctured subchannel 204B and a frequency response 406 of a bandpass filter according to some embodiments. The punctured subchannel 204B includes a first frequency band occupied by signals of the WLAN 100 (WLAN signals 402) and a second frequency band occupied by signals of incumbent systems (incumbent signals 404).

Prior to transmitting on a channel (e.g., a punctured subchannel 204B), a STA may perform a channel assessment to determine the state of the channel (e.g., whether the channel is currently busy or idle for the current frame). In general, the state of a channel may be determined by a STA in various ways. For example, a Clear Channel Assessment (CCA)-Carrier Sense (CS) mechanism may involve measuring a signal strength of a valid 802.11 symbol transmitted by the AP 102. However, in a punctured channel in which incumbent systems are utilizing a portion of the channel, this option is generally not feasible due to the interference from contributed from the incumbent systems, which may be very high due to the unpredictable power level and bandwidth).

As an alternative, a STA may utilize a CCA-Energy Detection (ED) mechanism. This mechanism may measure the total energy a station receives over the channel, regardless of whether a valid 802.11 symbol is received or not. The detected energy is then compared against a threshold (e.g., a threshold defined by 802.11ax). If the detected energy is above the threshold, the channel is deemed to be busy, otherwise the channel is deemed to be idle. The energy may be measured in any suitable manner. As just one example, a series of energy measurements may be made at different times and the measurements may be averaged to determine the detected energy. The detected energy (and associated thresholds) may be expressed in any suitable unit, such as milliwatts (mW), decibel-milliwatts (dBm), or an arbitrary unit.

In some situations, energy from transmissions of incumbent systems over the portion of a punctured subchannel used by the incumbent systems may exceed the threshold for determining whether a channel is busy. Thus, use of the standard CCA-ED mechanism may result in erroneous state detections, as a STA may determine a punctured subchannel is busy, even if the RUs of the subchannel that are available for use by the WLAN are idle. Various embodiments of the present disclosure adjust the CCA-ED mechanism to account for the energy of transmissions over portions of the channel that are being used by incumbent systems in order to accurately determine whether the portion usable by the WLAN is busy.

In various embodiments, during a CCA-ED procedure, a HE STA determines an energy level for frequencies of a channel (e.g., a channel that is to be used as a punctured subchannel in a HE PPDU) that are usable by the WLAN 100 (e.g., frequencies that are not used by incumbent systems). In a particular embodiment, this determination may include a measurement by the STA of the energy level for frequencies of the channel that are usable by the WLAN 100.

In some embodiments, the frequencies of the channel occupied by the incumbent systems (or alternatively the frequencies of the channel that are to be used by the WLAN 100) may be communicated to the STAs of the WLAN 100 prior to the performance of the energy measurements. For example, AP 102 may communicate the frequency band(s) that are used by incumbent systems (or to be used by the WLAN) within one or more channels to the HE STAs 104. The AP 102 may communicate this information at any suitable time or at any suitable periodic interval. As one example, the AP 102 may broadcast this information in a beacon frame to a BSS served by the AP. The AP 102 may discover the frequency band(s) used by incumbent systems in any suitable manner. As one example, indications of the frequency bands used by the incumbent systems may be communicated to the AP in an out-of-band fashion (e.g., via a wired network coupled to the AP by a management device). The indications may be pushed to the AP 102 in response to a change in the frequency bands or at a periodic interval, or the AP may periodically query a remote database for the indications. As another example, the AP may sample frequencies of a channel to determine which frequencies are used by incumbent systems.

Responsive to receiving an indication of the frequency band(s) used by the incumbent systems within a channel (or an indication of the frequency band(s) to be used within a channel), a HE STA 104 may configure a bandpass digital filter to filter out undesirable frequency components of the channel prior to the energy measurement. The bandpass digital filter may be part of the FEM, part of the radio IC, or part of the baseband processor, such as part of FEM 501, radio IC 502, or baseband processor 509 of FIG. 5. For example, the band pass digital filter may filter out frequencies of the channel used by the incumbent systems. As another example, the band pass digital filter may filter out all frequencies of the channel that are not usable by the WLAN (which may include the frequencies of the channel used by the incumbent systems). In the embodiment depicted, a frequency response 406 of an example bandpass filter is shown. In general, any frequencies of the channel that are not used by an incumbent but also not usable by the WLAN (e.g., because they fall within a band that is not usable within an RU) are likely to have a negligible energy level.

In various embodiments, a STA may utilize a separate bandpass digital filter for each channel that it measured by the STA that spans frequencies occupied by incumbent systems (i.e., channels that may be operated as punctured subchannels). If the channels used by the STA change during operation, the STA may update one or more of its filters based on the currently used channels and the presence of incumbent systems on these new channels. In various embodiments, a STA may store indications of the frequencies being used by incumbent systems, such that the STA may reconfigure one or more filters based on the stored indications in the event of a change of the channels used by the STA.

When the frequencies used by incumbent systems change, the AP 102 may send a communication to the STAs indicating the new bands of the frequencies used by the incumbents (explicitly through an indication of the frequencies used by the incumbents or implicitly through an indication of the frequencies usable by the WLAN 100). The AP 102 may send this communication immediately upon a detection of a change, or during the next periodic update in which the AP would normally send the frequencies to the STAs.

In some embodiments, a HE STA determines an energy level for frequencies of a channel that are usable by the WLAN 100 (e.g., frequencies that are not used by incumbent systems) by measuring the energy over the entire channel (e.g., by using the legacy CCA-ED mechanism) and then deducting an amount of energy attributable to the frequencies on which the incumbent systems are communicating.

The amount of energy attributable to the frequencies used by the incumbent systems may be determined by a STA in any suitable manner. For example, a HE STA 104 may perform long term measurements on the frequencies of a channel to determine the amount of energy attributable to the frequencies used by the incumbent systems. As another example, a AP 102 may communicate (e.g., in a beacon frame) the amount of energy attributable to the frequencies used by the incumbent systems to the HE STA 104 (e.g., after performing long term measurements on the frequencies of the channel or determining the amount of energy is any other suitable manner). It is generally safe to assume that the AP and the STAs see the same energy level for incumbent systems as the incumbent systems are relatively far away from the AP and STAs, so the measurements shouldn't vary appreciably whether performed at the AP or the HE STA.

In another example, the AP may obtain information regarding the amount of energy attributable to the frequencies used by the incumbent systems from any suitable source and send this information to one or more STAs or process the information into a format usable by the STAs and then communicate the information to the STAs. For example, the AP may receive information indicating one or more frequency bands and one or more transmission powers used by incumbent systems and may generate segments of information that each pertain to a particular channel and the energy for the frequencies used by the incumbent systems in that channel. The information received by the AP may be pushed to the AP in response to a change in one or more frequency bands or transmission power or periodically, or the AP may periodically query a remote database for the indications.

In a particular embodiment, AP 102 may broadcast the amount of energy (or other information enabling a HE STA to calculate the amount of energy) attributable to the frequencies used by the incumbent systems to all STAs in a BSS (e.g., by quantizing the energy within a beacon frame). In another embodiment, the AP may send this information to a STA at the time the STA associates with the AP.

In various embodiments, a STA may use different thresholds for different channels when performing CCA-ED. For example, for a channel that is not being used by incumbent systems, the STA may determine the energy across the entire channel and compare this energy against a first threshold. For a channel that is being used by incumbent systems, the STA may determine the energy across a portion of the channel (e.g., the portion not used by the incumbent systems), and compare this energy against a second threshold that is less than the first threshold. In various embodiments, the second threshold is dynamically adjustable based on how much of the channel is usable by the WLAN 100. For example, if incumbent systems utilize a relatively large portion of the channel, the second threshold will be smaller, and if incumbent systems utilize a relatively small portion of the channel, the second threshold will be larger. Any number of different thresholds may be used for any number of channels being measured by an HE STA 104.

Although the examples described above focus on energy detection for a single 20 MHz channel, the techniques may be adapted for different size channels or bonded channels (i.e., multiple aggregated channels). Thus, a STA may measure the energy across an 80 MHz band and utilize one or more filters or subtract known energy amounts to determine the energy generated by the WLAN (as opposed to energy generated by incumbent systems) during a channel assessment.

Figure 5:
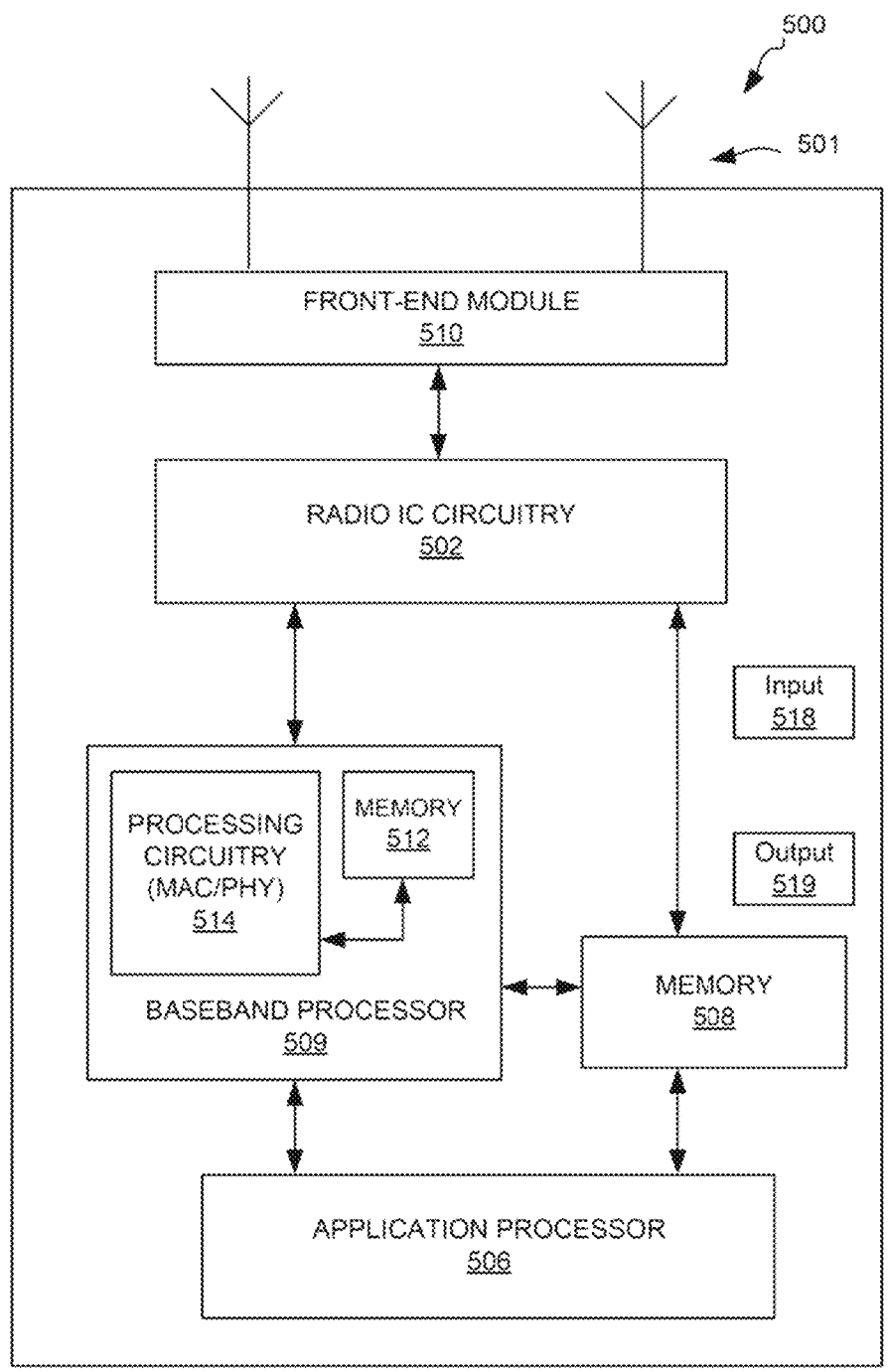
FIG. 5 illustrates an example radio architecture to implement some embodiments.

FIG. 5 illustrates an example radio architecture to implement some embodiments. FIG. 5 includes a block diagram of a wireless communication system such as STA 500 or AP 500 (hereinafter STA/AP 500) such as any of HE STAs 104, or AP 102 of FIG. 1, according to various embodiments. A wireless communication system may include a wireless communication radio architecture in accordance with some demonstrative embodiments. The depicted radio architecture includes radio front-end module (FEM) circuitry 510, radio integrated circuit (IC) circuitry 502, and baseband processor 509. In FIG. 5, the representation of a single antenna may be interpreted to include one or more antennas. Although FIG. 5 shows a single radio IC circuitry block 502, a single FEM circuitry block 510, and a single baseband processor block 509; these blocks are to be viewed as representing the possibility of one or more circuitry blocks, where potentially one set of distinct circuitry blocks, for example, a distinct FEM circuitry, and/or a distinct radio IC circuitry, would work to provide the relevant functionalities noted herein. As used herein, "processing circuitry" or "processor" may include one or more distinctly identifiable processor blocks. As used herein, "processing" may entail processing fully or processing partially; and "decoding" may entail decoding fully or decoding partially.

FEM circuitry 510 may include a receive signal path comprising circuitry configured to operate on Radio Frequency (RF) signals received from one or more antennas 501, to amplify the received signals and to provide the amplified versions of the received signals to the radio IC circuitry 502 for further processing. FEM circuitry 510 may also include a transmit signal path which may include circuitry configured to amplify signals provided by the radio IC circuitry 502 for wireless transmission by one or more of the antennas 501. The receive signal path of the FEM circuitry 510 may include a low-noise amplifier (LNA) to amplify received RF signals and provide the amplified received RF signals as an output (e.g., to the radio IC circuitry 502). The transmit signal path of the FEM circuitry 510 may include a power amplifier (PA) to amplify input signals provided by the radio IC circuitry 502, and one or more filters, such as band-pass filters (BPFs), low-pass filters (LPFs) or other types of filters, to generate signals for subsequent transmission (e.g., by one or more of the antennas 501).

In some dual-mode embodiments for Wi-Fi communication, the FEM circuitry 510 may be configured to operate in either the 2.4 GHz frequency spectrum or the 5 GHz frequency spectrum. In these embodiments (or in other embodiments in which the FEM circuitry 510 may operate in one or more other frequency spectrums), the receive signal path of the FEM circuitry may include a receive signal path duplexer (or other circuitry) to separate the signals from each spectrum as well as provide a separate low noise amplifier (LNA) for each spectrum. In these embodiments, the transmit signal path of the FEM circuitry may also include a power amplifier and a filter, such as a BPF, a LPF or another type of filter for each frequency spectrum and a transmit signal path duplexer (or other circuitry) to provide the signals of one of the different spectrums onto a single transmit path for subsequent transmission by the one or more of the antennas 501. In some embodiments, Bluetooth (BT) communications may utilize the 2.4 GHZ signal paths and may utilize the same FEM circuitry 510 as the one used for WLAN communications.

The antennas 501 may include directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Radio IC circuitry 502 as shown may include a receive signal path and a transmit signal path. The receive signal path of the radio IC circuitry 502 may include at least mixer circuitry, such as, for example, down-conversion mixer circuitry, amplifier circuitry and filter circuitry. The transmit signal path of the radio IC circuitry 502 may include at least filter circuitry and mixer circuitry, such as, for example, up-conversion mixer circuitry. Radio IC circuitry 502 may also include synthesizer circuitry for synthesizing a frequency for use by the mixer circuitries of the respective receive and transmit signal paths. The mixer circuitries of each of the receive and transmit signal paths may each, according to some embodiments, be configured to provide direct conversion functionality. The latter type of circuitry presents a much simpler architecture as compared with standard super-heterodyne mixer circuitries, and any flicker noise brought about by the same may be alleviated, for example, through the use of OFDM modulation. Each mixer circuitry may include one or more mixers, and filter circuitries may each include one or more filters, such as one or more BPFs and/or LPFs according to application needs. For example, when mixer circuitries are of the direct-conversion type, they may each include two or more mixers.

Baseband processing circuity 509 may include processing circuitry 514 that provides Wi-Fi functionality. In the instant description, the baseband processor 509 may include a memory 512, such as, for example, a set of RAM arrays in a Fast Fourier Transform or Inverse Fast Fourier Transform block (not shown) of the baseband processor 509 from and into which the processing circuitry 514 may read and write data, such as, for example, data relating to butterfly operations. Memory 512 may further store control logic. Processing circuitry 514 may implement control logic within the memory to process the signals received from the receive signal path of the radio IC circuitry 502. Baseband processor 509 is additionally configured to also generate corresponding baseband signals for the transmit signal path of the radio IC circuitry 502 and may further include physical layer (PHY) and medium access control layer (MAC) circuitry and may further interface with application processor 506 for generation and processing of the baseband signals and for controlling operations of the radio IC circuitry 502.

In some demonstrative embodiments, the front-end module circuitry 510, the radio IC circuitry 502, and baseband processor 509 may be provided on a single radio card. In some other embodiments, the one or more antennas 501, the FEM circuitry 510 and the radio IC circuitry 502 may be provided on a single radio card. In some other embodiments, the radio IC circuitry 502 and the baseband processor 509 may be provided on a single chip or integrated circuit (IC).

In some other embodiments, the radio architecture of STA/AP 500 may be configured to transmit and receive signals transmitted using one or more modulation techniques other than OFDM or OFDMA, such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, and On-Off Keying (OOK), although the scope of the embodiments is not limited in this respect.

In some demonstrative embodiments, the radio-architecture of STA/AP 500 may include other radio cards, such as a WiGig radio card, or a cellular radio card configured for cellular (e.g., 3GPP such as LTE, LTE-Advanced or 5G communications).

In some IEEE 802.11 embodiments, the radio architecture of STA/AP 500 may be configured for communication over various channel bandwidths including bandwidths having center frequencies of 900 MHz, 2.4 GHz, 5 GHz, and bandwidths of less than 5 MHz, or of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths), or any combination of the above frequencies or bandwidths, or any frequencies or bandwidths between the ones expressly noted above. In some demonstrative embodiments, a 320 MHz channel bandwidth may be used. In a further embodiment, the radio architecture of STA/AP 500 may be configured to operate on center frequencies above 45 GHz. The scope of the embodiments is not limited with respect to the above frequencies however. For example, the radio architecture of STA/AP 500 may be configured to operate on center frequencies at or near 6 GHz.

Referring still to FIG. 5, in some demonstrative embodiments, STA/AP 500 may further include an input unit 518, an output unit 519, and a memory unit 508. STA/AP 500 may optionally include other suitable hardware components and/or software components. In some demonstrative embodiments, some or all of the components of STA/AP 500 may be enclosed in a common housing or packaging and may be interconnected or operably associated using one or more wired or wireless links. In other embodiments, components of STA/AP 500 may be distributed among multiple or separate devices.

In some demonstrative embodiments, application processor 506 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Application processor 506 may execute instructions, for example, of an Operating System (OS) of STA/AP 500 and/or of one or more suitable applications.

In some demonstrative embodiments, input unit 518 may include, for example, one or more input pins on a circuit board, a keyboard, a keypad, a mouse, a touch-screen, a touch-pad, a track-ball, a stylus, a microphone, or other suitable pointing device or input device. Output unit 519 may include, for example, one or more output pins on a circuit board, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 508 may include, for example, a Random-Access Memory (RAM), a Read-Only Memory (ROM), a Dynamic RAM (DRAM), a Synchronous DRAM (SD-RAM), a flash memory, a volatile memory, a non-volatile memory, a cache memory, a buffer, a short-term memory unit, a long-term memory unit, or other suitable memory units. In various embodiments, STA/AP 500 may include or be coupled to a storage unit which may include, for example, a hard disk drive, a floppy disk drive, a Compact Disk (CD) drive, a CD-ROM drive, a DVD drive, or other suitable removable or non-removable storage units. Memory unit 508 and/or the storage unit, for example, may store data processed by STA/AP 500.

Some demonstrative embodiments include a wireless communication device, such as baseband processor 509 of FIG. 5, including a memory, such as memory 512, and a processing circuitry, such as processing circuitry 514 coupled the memory. The processing circuitry is to decode at least one signal field portion of a signal field of a PPDU received over a bonded channel, the bonded channel comprising a plurality of subchannels including a punctured subchannel, the signal field portion on at least one unpunctured subchannel of the plurality of subchannels; determine, from the at least one signal field portion, information on a resource allocation for the device, the resource allocation indicating at least one RU used in a data field of the PPDU for the device; and decode a data field portion of the data field of the PPDU, the data field portion received on a part of the punctured subchannel based on the resource allocation.

Other demonstrative embodiments include a wireless communication device, such as baseband processor 509 of FIG. 5, including a memory, such as memory 512, and a processing circuitry, such as processing circuitry 514 coupled the memory. The processing circuitry is to decode at least one signal field portion of a signal field of a PPDU received over a bonded channel, the bonded channel comprising a plurality of subchannels including a punctured subchannel, the signal field portion on at least one unpunctured subchannel of the plurality of subchannels; determine, from the at least one signal field portion, information on a resource allocation for the device, the resource allocation indicating at least one resource unit (RU) used in a data field of the PPDU for the device; and decode a data field portion of the data field of the PPDU, the data field portion received on a part of the punctured subchannel based on the resource allocation.

FIG. 6 illustrates a first embodiment of a method to be implemented at a wireless communication device, such as at AP 500 of FIG. 5. The method 600 in FIG. 6 includes, at operation 602, encoding a Physical Layer Convergence Protocol (PLCP) Data Unit (PPDU) to be transmitted over a bonded channel, the bonded channel comprising a plurality of subchannels including a punctured subchannel, wherein: the PPDU includes a signal field and a data field, the signal field including signal field portions carrying information on resource allocations for at least one wireless station (STA) addressed by the PPDU, the resource allocations indicating resource units (RUs) used in the data field for the at least one STA, the signal field portions encoded on unpunctured subchannels of the plurality of subchannels; the data field includes first data field portions on the unpunctured subchannels, and at least one second data field portion on a part of the punctured subchannel; and a signal field portion of the signal field portions includes a resource allocation for a STA of the at least one STA indicating at least one RU used in the at least one second data field portion within the punctured subchannel. The method 600 further includes, at operation 604, generating a signal to cause transmission of the PPDU over the bonded channel.

Figure 7:
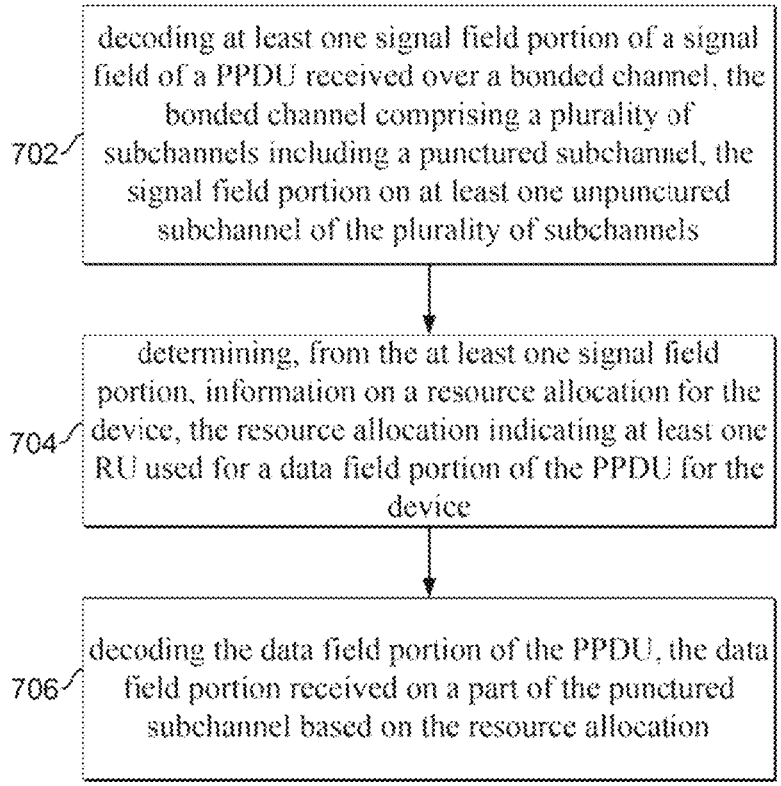
FIG. 7 illustrates a method to be performed at a STA according to some embodiments.

FIG. 7 illustrates a first embodiment of a method to be implemented at a wireless communication device, such as at STA 500 of FIG. 5. The method 700 in FIG. 7 includes, at operation 702, decoding at least one signal field portion of a signal field of a Physical Layer Convergence Protocol (PLCP) Data Unit (PPDU) received over a bonded channel, the bonded channel comprising a plurality of subchannels including a punctured subchannel, the at least one signal field portion on at least one unpunctured subchannel of the plurality of subchannels. The method 700 further includes, at operation 704, determining, from the at least one signal field portion, information on a resource allocation for the device, the resource allocation indicating at least one resource unit (RU) used for a data field portion of the PPDU for the device. The method 700 further includes, at operation 706, decoding the data field portion of the PPDU, the data field portion received on a part of the punctured subchannel based on the resource allocation.

Figure 8:
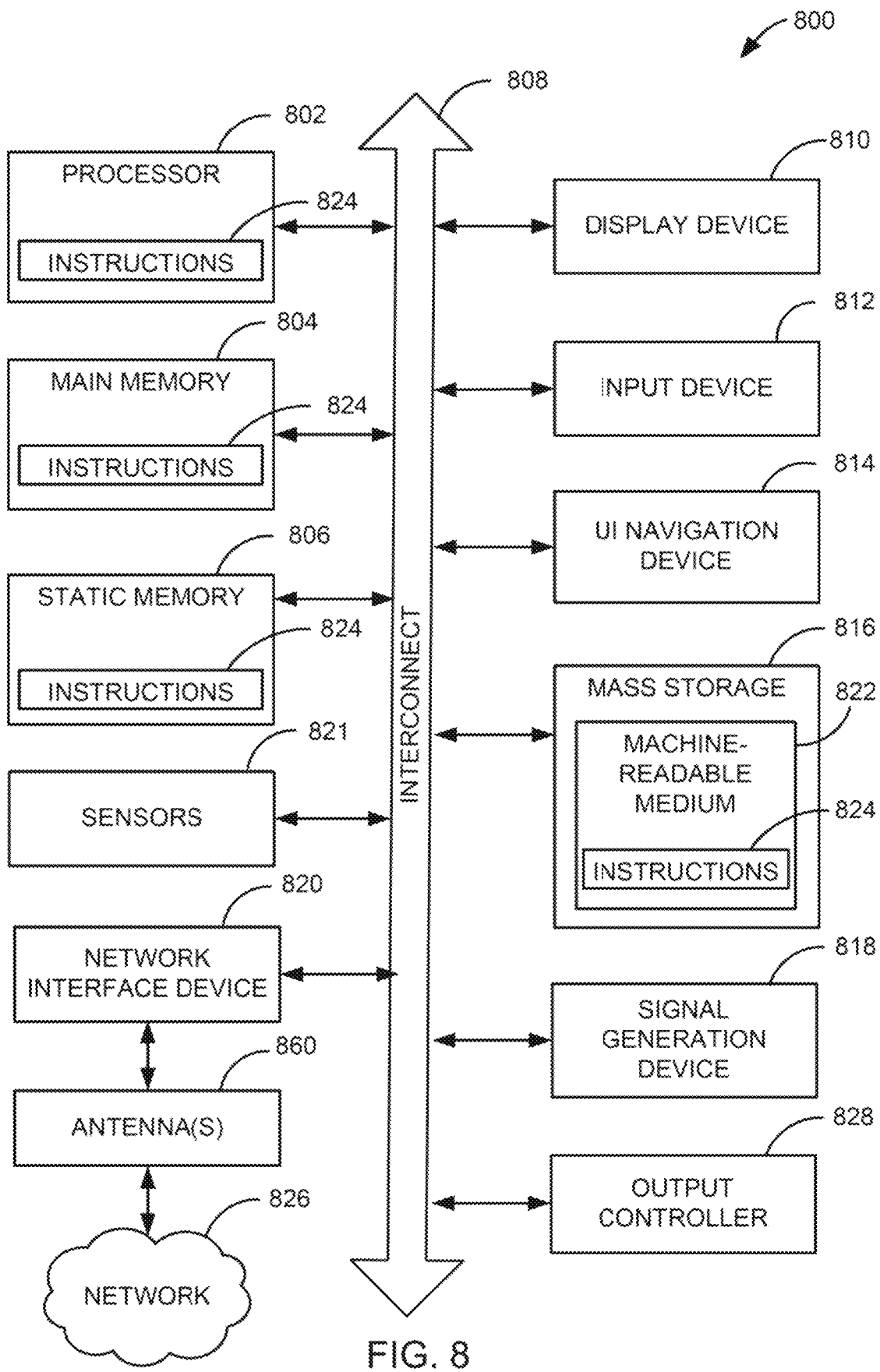
FIG. 8 illustrates a block diagram of an example machine which may perform any one or more of the techniques (e.g., methodologies) of some embodiments.

FIG. 8 illustrates a block diagram of an example machine 800 upon which any one or more of the techniques (e.g., methodologies) discussed herein may performed. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be an AP 102, HE STA 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, such as an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804, and a static memory 806; some or all of which may communicate with each other via an interlink (e.g., bus) 808. The machine 800 may further include a display device 810, an input device 812 (e.g., a keyboard), and a user interface (UI) navigation device 814 (e.g., a mouse). In an example, the display device 810, input device 812 and UI navigation device 814 may be a touch screen display. The machine 800 may additionally include a mass storage (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments, the processor 802 and/or instructions 824 may comprise processing circuitry and/or transceiver circuitry.

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium, or multiple media (e.g., a centralized or distributed database, and/or associated caches and servers) configured to store the one or more instructions 824.

An apparatus of the machine 800 may be one or more of a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 820 may include one or more physical jacks (e.g., Ethernet, coaxial, or phone jacks) or one or more antennas to connect to the communications network 826. In an example, the network interface device 820 may include one or more antennas 860 to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques. The term "transmission medium" shall be taken to include any intangible medium that is capable of storing, encoding or carrying instructions for execution by the machine 800, and includes digital or analog communications signals or other intangible medium to facilitate communication of such software.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

EXAMPLES

The following examples pertain to further embodiments.

Example 1 includes a wireless communication device including a memory, and a processing circuitry coupled to the memory, the processing circuitry to: encode a Physical Layer Convergence Protocol (PLCP) Data Unit (PPDU) to be transmitted over a bonded channel, the bonded channel comprising a plurality of subchannels including a punctured subchannel, wherein: the PPDU includes a signal field and a data field, the signal field including signal field portions carrying information on resource allocations for at least one wireless station (STA) addressed by the PPDU, the resource allocations indicating resource units (RUs) used in the data field for the at least one STA, the signal field portions encoded on unpunctured subchannels of the plurality of subchannels; the data field includes first data field portions on the unpunctured subchannels, and at least one second data field portion on a part of the punctured subchannel; and a signal field portion of the signal field portions includes a resource allocation for a STA of the at least one STA indicating at least one RU used in the at least one second data field portion within the punctured subchannel; and generate a signal to cause transmission of the PPDU over the bonded channel.

Example 2 includes the subject matter of Example 1, and optionally, wherein the PPDU is a Multi-User Multiple-Input Multiple-Output (MU-MIMO) PPDU, the at least one STA includes a plurality of STAs, and the signal field includes a High Efficiency Signal B field (HE-SIG-B).

Example 3 includes the subject matter of Example 2, and optionally, wherein the PPDU includes a Legacy Short Training field (L-STF), a Legacy Long Training Field (L-LTF) following the L-STF in a time domain, a Legacy Signal field (L-SIG) following the L-LTF in the time domain, and a High Efficiency Signal A field (HE-SIG-A) following the L-SIG and preceding the HE-SIG-B in a time domain.

Example 4 includes the subject matter of Example 3, and optionally, the L-STF, L-LTF, L-SIG, HE-SIG-A and HE-SIG-B are part of a preamble portion of the PPDU the preamble portion further including a High Efficiency Short Training field (HE-STF) and a High Efficiency Long Training field (HE-LTF) following the HE-STF and preceding the data field in the time domain, the HE-STF including HE-STF sub-portions, the HE-LTF including HE-LTF sub-portions, and the HE-SIG-B including HE-SIG-B sub-portions corresponding to the signal field portions; the first data field portion and the at least one second data field portion each include data sub-portions; and each of the HE-STF sub-portions, the HE-LTF sub-portions and the data sub-portions occupies a bandwidth that is less than a bandwidth occupied by one of the HE-SIG-B sub-portions.

Example 5 includes the subject matter of Example 1, and optionally, wherein: the bonded channel has a bandwidth of one of 80 MHz or 160 MHz; and the subchannels each have a bandwidth of 20 MHz.

Example 6 includes the subject matter of Example 1, and optionally, wherein: the signal field portion of the signal field portions is not duplicated over the unpunctured subchannels when the bonded channel has a bandwidth of 80 MHz; or the signal field portion of the signal field portions is duplicated over the unpunctured subchannels when the bonded channel has a bandwidth of 160 MHz.

Example 7 includes the subject matter of Example 1, and optionally, wherein a center frequency of the bonded channel is about 6 GHz.

Example 8 includes the subject matter of Example 1, and optionally, wherein the processing circuitry is to: identify an energy level present over a frequency range corresponding to a first portion of the punctured subchannel; and generate a signal including information about the energy level present over a frequency range corresponding to a first portion of the punctured subchannel to a first STA of the at least one STA to allow the first STA to determine an energy level present over a frequency range corresponding to a second portion of the punctured subchannel.

Example 9 includes the subject matter of Example 1, and optionally, wherein the processing circuitry is to generate a signal to cause an identification of a first portion of the punctured subchannel to be transmitted to a first STA of the at least one STA to allow the STA to determine an energy level present over a frequency range corresponding to a second portion of the punctured subchannel based on the identification of the first portion of the punctured subchannel.

Example 10 includes the subject matter of Example 1, and optionally, further including a radio integrated circuit coupled to the processing circuitry, and a front-end module coupled to the radio integrated circuit.

Example 11 includes the subject matter of Example 10, and optionally, further including a plurality of antennas coupled to the front-end module.

Example 12 includes a method to be performed at a wireless communication device that includes a memory and a processing circuitry coupled to the memory, the method including: encoding, by the processing circuitry, a Physical Layer Convergence Protocol (PLCP) Data Unit (PPDU) to be transmitted over a bonded channel, the bonded channel comprising a plurality of subchannels including a punctured subchannel, wherein: the PPDU includes a signal field and a data field, the signal field including signal field portions carrying information on resource allocations for at least one wireless station (STA) addressed by the PPDU, the resource allocations indicating resource units (RUs) used in the data field for the at least one STA, the signal field portions encoded on unpunctured subchannels of the plurality of subchannels; the data field includes first data field portions on the unpunctured subchannels, and at least one second data field portion on a part of the punctured subchannel; and a signal field portion of the signal field portions includes a resource allocation for a STA of the at least one STA indicating at least one RU used in the at least one second data field portion within the punctured subchannel; and generating, by the processing circuitry, a signal to cause transmission of the PPDU over the bonded channel.

Example 13 includes the subject matter of Example 12, and optionally, wherein the PPDU is a Multi-User Multiple-Input Multiple-Output (MU-MIMO) PPDU, the at least one STA includes a plurality of STAs, and the signal field includes a High Efficiency Signal B field (HE-SIG-B).

Example 14 includes the subject matter of Example 13, and optionally, wherein the PPDU includes a Legacy Short Training field (L-STF), a Legacy Long Training Field (L-LTF) following the L-STF in a time domain, a Legacy Signal field (L-SIG) following the L-LTF in the time domain, and a High Efficiency Signal A field (HE-SIG-A) following the L-SIG and preceding the HE-SIG-B in a time domain.

Example 15 includes the subject matter of Example 14, and optionally, wherein: the L-STF, L-LTF, L-SIG, HE-SIG-A and HE-SIG-B are part of a preamble portion of the PPDU the preamble portion further including a High Efficiency Short Training field (HE-STF) and a High Efficiency Long Training field (HE-LTF) following the HE-STF and preceding the data field in the time domain, the HE-STF including HE-STF sub-portions, the HE-LTF including HE-LTF sub-portions, and the HE-SIG-B including HE-SIG-B sub-portions corresponding to the signal field portions; the first data field portion and the at least one second data field portion each include data sub-portions; and each of the HE-STF sub-portions, the HE-LTF sub-portions and the data sub-portions occupies a bandwidth that is less than a bandwidth occupied by one of the HE-SIG-B sub-portions.

Example 16 includes the subject matter of Example 12, and optionally, wherein: the bonded channel has a bandwidth of one of 80 MHz or 160 MHz; and the subchannels each have a bandwidth of 20 MHz.

Example 17 includes the subject matter of Example 12, and optionally, wherein: the signal field portion of the signal field portions is not duplicated over the unpunctured subchannels when the bonded channel has a bandwidth of 80 MHz; or the signal field portion of the signal field portions is duplicated over the unpunctured subchannels when the bonded channel has a bandwidth of 160 MHz.

Example 18 includes the subject matter of Example 12, and optionally, further comprising: identifying an energy level present over a frequency range corresponding to a first portion of the punctured subchannel; and generating a signal including information on the energy level present over a frequency range corresponding to a first portion of the punctured subchannel to a first STA of the at least one STA to allow the first STA to determine an energy level present over a frequency range corresponding to a second portion of the punctured subchannel.

Example 19 includes the subject matter of Example 12, and optionally, the processing circuitry to generate a signal to cause an identification of a first portion of the punctured subchannel to be transmitted to a first STA of the at least one STA to allow the first STA to determine an energy level present over a frequency range corresponding to a second portion of the punctured subchannel based on the identification of the first portion of the punctured subchannel.

Example 20 includes a wireless communication device that includes a memory and a processing circuitry coupled to the memory, the device including: means (e.g., access point 102 or any component thereof, e.g., baseband processor 509) for encoding a Physical Layer Convergence Protocol (PLCP) Data Unit (PPDU) to be transmitted over a bonded channel, the bonded channel comprising a plurality of subchannels including a punctured subchannel, wherein: the PPDU includes a signal field and a data field, the signal field including signal field portions carrying information on resource allocations for at least one wireless station (STA) addressed by the PPDU, the resource allocations indicating resource units (RUs) used in the data field for the at least one STA, the signal field portions encoded on unpunctured subchannels of the plurality of subchannels; the data field includes first data field portions on the unpunctured subchannels, and at least one second data field portion on a part of the punctured subchannel; and a signal field portion of the signal field portions includes a resource allocation for a STA of the at least one STA indicating at least one RU used in the at least one second data field portion within the punctured subchannel; and means (e.g., access point 102 or any component thereof, e.g., baseband processor 509) for generating a signal to cause transmission of the PPDU over the bonded channel.

Example 21 includes the subject matter of Example 20, and optionally, wherein the PPDU is a Multi-User Multiple-Input Multiple-Output (MU-MIMO) PPDU, the at least one STA includes a plurality of STAs, and the signal field includes a High Efficiency Signal B field (HE-SIG-B).

Example 22 includes the subject matter of Example 21, and optionally, wherein the PPDU includes a Legacy Short Training field (L-STF), a Legacy Long Training Field (L-LTF) following the L-STF in a time domain, a Legacy Signal field (L-SIG) following the L-LTF in the time domain, and a High Efficiency Signal A field (HE-SIG-A) following the L-SIG and preceding the HE-SIG-B in a time domain.

Example 23 includes the subject matter of Example 20, and optionally, further comprising: means (e.g., access point 102 or any component thereof, e.g., baseband processor 509, radio IC circuitry 502, and/or FE module 510) for identifying an energy level present over a frequency range corresponding to a first portion of the punctured subchannel; and means (e.g., access point 102 or any component thereof, e.g., baseband processor 509, radio IC circuitry 502, and/or FE module 510) for generating a signal including information on the energy level present over a frequency range corresponding to a first portion of the punctured subchannel to a first STA of the at least one STA to allow the first STA to determine an energy level present over a frequency range corresponding to a second portion of the punctured subchannel.

Example 24 includes the subject matter of Example 20, and optionally, further comprising means (e.g., access point 102 or any component thereof, e.g., baseband processor 509, radio IC circuitry 502, and/or FE module 510) for generating a signal to cause an identification of a first portion of the punctured subchannel to be transmitted to a first STA of the at least one STA to allow the first STA to determine an energy level present over a frequency range corresponding to a second portion of the punctured subchannel based on the identification of the first portion of the punctured subchannel.

Example 25 includes a machine readable storage including machine readable instructions which, when executed, are to implement a method or realize a device as described in any of the preceding examples.

Example 26 includes a wireless communication device including a memory, and a processing circuitry coupled to the memory, the processing circuitry to: decode at least one signal field portion of a signal field of a Physical Layer Convergence Protocol (PLCP) Data Unit (PPDU) received over a bonded channel, the bonded channel comprising a plurality of subchannels including a punctured subchannel, the at least one signal field portion on at least one unpunctured subchannel of the plurality of subchannels; determine, from the at least one signal field portion, information on a resource allocation for the device, the resource allocation indicating at least one resource unit (RU) used for a data field portion of the PPDU for the device; and decode the data field portion of the PPDU, the data field portion received on a part of the punctured subchannel based on the resource allocation.

Example 27 includes the subject matter of Example 26, and optionally, wherein the PPDU is a Multi-User Multiple-Input Multiple-Output (MU-MIMO) PPDU, and the signal field includes a High Efficiency Signal B field (HE-SIG-B).

Example 28 includes the subject matter of Example 27, and optionally, wherein the PPDU includes a Legacy Short Training field (L-STF), a Legacy Long Training Field (L-LTF) following the L-STF in a time domain, a Legacy Signal field (L-SIG) following the L-LTF in the time domain, and a High Efficiency Signal A field (HE-SIG-A) following the L-SIG and preceding the HE-SIG-B in the time domain, and wherein the processing circuitry is to decode the L-STF, the L-LTF, the L-SIG, and the HE-SIG-A.

Example 29 includes the subject matter of Example 28, and optionally, wherein: the L-STF, L-LTF, L-SIG, HE-SIG-A and HE-SIG-B are part of a preamble portion of the PPDU, the preamble portion further including a High Efficiency Short Training field (HE-STF), and a High Efficiency Long Training field (HE-LTF) following the HE-STF and preceding the data field in the time domain, the HE-STF including HE-STF sub-portions, the HE-LTF including HE- LTF sub-portions, and the HE-SIG-B including HE-SIG-B sub-portions corresponding to the signal field portions; the data field portion includes data sub-portions; each of the HE-STF sub-portions, the HE-LTF sub-portions and the data sub-portions occupies a bandwidth that is less than a bandwidth occupied by one of the HE-SIG-B sub-portions; and the processing circuitry is to decode an HE-STF sub-portion, an HE-LTF sub-portion, and the data sub-portion that occupy the part of the punctured subchannel.

Example 30 includes the subject matter of Example 26, and optionally, wherein: the bonded channel has a bandwidth of one of 80 MHz or 160 MHz; and the subchannels each have a bandwidth of 20 MHz.

Example 31 includes the subject matter of Example 26, and optionally, wherein the signal field portion is not duplicated over the unpunctured subchannels.

Example 32 includes the subject matter of Example 26, and optionally, wherein a center frequency of the bonded channel is about 6 GHz.

Example 33 includes the subject matter of Example 26, and optionally, further including circuitry to: determine an energy level present over a frequency range corresponding to a first portion of the punctured subchannel; and determine whether the frequency range corresponding to the first portion of the punctured subchannel is busy or idle based on the determined energy level.

Example 34 includes the subject matter of Example 33, and optionally, wherein the circuitry to determine the energy level is to determine the energy level present over the frequency range corresponding to the first portion of the punctured subchannel by subtracting an energy level present over a frequency range corresponding to a second portion of the punctured subchannel from an energy level over a frequency range corresponding to the entire punctured subchannel.

Example 35 includes the subject matter of Example 26, and optionally, wherein the circuitry to determine the energy level includes a bandpass filter to filter out an energy level present over a frequency range corresponding to a second portion of the punctured subchannel to determine the energy level present over the frequency range corresponding to the first portion of the punctured subchannel.

Example 36 includes the subject matter of Example 26, and optionally, further including a radio integrated circuit coupled to the processing circuitry, and a front-end module coupled to the radio integrated circuit.

Example 37 includes the subject matter of Example 36, and optionally, further including a plurality of antennas coupled to the front-end module.

Example 38 includes a method to be performed at a wireless communication device that includes a memory and a processing circuitry coupled to the memory, the method including: decoding, by the processing circuitry, at least one signal field portion of a signal field of a Physical Layer Convergence Protocol (PLCP) Data Unit (PPDU) received over a bonded channel, the bonded channel comprising a plurality of subchannels including a punctured subchannel, the signal field portion on at least one unpunctured subchannel of the plurality of subchannels; determining, from the at least one signal field portion, information on a resource allocation for the device, the resource allocation indicating at least one resource unit (RU) used for a data field portion of the PPDU for the device; and decoding the data field portion of the PPDU, the data field portion received on a part of the punctured subchannel based on the resource allocation.

Example 39 includes the subject matter of Example 38, and optionally, wherein the PPDU is a Multi-User Multiple-Input Multiple-Output (MU-MIMO) PPDU, and the signal field includes a High Efficiency Signal B field (HE-SIG-B).

Example 40 includes the subject matter of Example 39, and optionally, wherein the PPDU includes a Legacy Short Training field (L-STF), a Legacy Long Training Field (L-LTF) following the L-STF in a time domain, a Legacy Signal field (L-SIG) following the L-LTF in the time domain, and a High Efficiency Signal A field (HE-SIG-A) following the L-SIG and preceding the HE-SIG-B in the time domain, and wherein the processing circuitry is to decode the L-STF, the L-LTF, the L-SIG, and the HE-SIG-A.

Example 41 includes the subject matter of Example 40, and optionally, wherein: the L-STF, L-LTF, L-SIG, HE-SIG-A and HE-SIG-B are part of a preamble portion of the PPDU, the preamble portion further including a High Efficiency Short Training field (HE-STF), and a High Efficiency Long Training field (HE-LTF) following the HE-STF and preceding the data field in the time domain, the HE-STF including HE-STF sub-portions, the HE-LTF including HE-LTF sub-portions, and the HE-SIG-B including HE-SIG-B sub-portions corresponding to the signal field portions; the data field portion includes data sub-portions; each of the HE-STF sub-portions, the HE-LTF sub-portions and the data sub-portions occupies a bandwidth that is less than a bandwidth occupied by one of the HE-SIG-B sub-portions; and the processing circuitry is to decode an HE-STF sub-portion, an HE-LTF sub-portion, and the data sub-portion that occupy the part of the punctured subchannel.

Example 42 includes the subject matter of Example 38, and optionally wherein the bonded channel has a bandwidth of one of 80 MHz or 160 MHz; and the subchannels each have a bandwidth of 20 MHz.

Example 43 includes the subject matter of Example 38, and optionally wherein the signal field portion is not duplicated over the unpunctured subchannels.

Example 44 includes the subject matter of Example 38, and optionally wherein a center frequency of the bonded channel is about 6 GHz.

Example 45 includes the subject matter of Example 38, and optionally, further comprising: determining an energy level present over a frequency range corresponding to a first portion of the punctured subchannel; and determining whether the frequency range corresponding to the first portion of the punctured subchannel is busy or idle based on the determined energy level.

Example 46 includes the subject matter of Example 45, and optionally, further comprising determining the energy level present over the frequency range corresponding to the first portion of the punctured subchannel by subtracting an energy level present over a frequency range corresponding to a second portion of the punctured subchannel from an energy level over a frequency range corresponding to the entire punctured subchannel.

Example 47 includes the subject matter of Example 45, and optionally, further comprising filtering out an energy level present over a frequency range corresponding to a second portion of the punctured subchannel to determine the energy level present over the frequency range corresponding to the first portion of the punctured subchannel.

Example 48 includes a wireless communication device that includes a memory and a processing circuitry coupled to the memory, the device including: means (e.g., STA 104 or any component thereof, e.g., baseband processor 509, radio IC circuitry 502, and/or FE module 510) for decoding at least one signal field portion of a signal field of a Physical Layer Convergence Protocol (PLCP) Data Unit (PPDU) received over a bonded channel, the bonded channel comprising a plurality of subchannels including a punctured subchannel, the signal field portion on at least one unpunctured subchannel of the plurality of subchannels; determining, from the at least one signal field portion, information on a resource allocation for the device, the resource allocation indicating at least one resource unit (RU) used for a data field portion of the PPDU for the device; and means (e.g., STA 104 or any component thereof, e.g., baseband processor 509, radio IC circuitry 502, and/or FE module 510) for decoding the data field portion of the PPDU, the data field portion received on a part of the punctured subchannel based on the resource allocation.

Example 49 includes the subject matter of Example 48, and optionally, further comprising: means (e.g., STA 104 or any component thereof, e.g., baseband processor 509, radio IC circuitry 502, and/or FE module 510) for determining an energy level present over a frequency range corresponding to a first portion of the punctured subchannel; and means for determining whether the frequency range corresponding to the first portion of the punctured subchannel is busy or idle based on the determined energy level.

Example 50 includes the subject matter of Example 48, and optionally, further including means (e.g., STA 104 or any component thereof, e.g., baseband processor 509, radio IC circuitry 502, and/or FE module 510) for determining the energy level present over the frequency range corresponding to the first portion of the punctured subchannel by subtracting an energy level present over a frequency range corresponding to a second portion of the punctured subchannel from an energy level over a frequency range corresponding to the entire punctured subchannel.

Example 51 includes a machine readable storage including machine readable instructions which, when executed, are to implement a method or realize a device as described in any of the preceding examples.

What is claimed is:

1. A wireless communication device including:
   a memory, and
   a processing circuitry coupled to the memory, the processing circuitry to:
   decode at least one signal field portion of a signal field of a Physical Layer Convergence Protocol (PLCP) Data Unit (PPDU) received over a bonded channel, the bonded channel comprising a plurality of subchannels including a punctured subchannel, the at least one signal field portion received on at least one unpunctured subchannel of the plurality of subchannels, wherein the at least one signal field portion is not duplicated over the punctured subchannels;
   determine, from the at least one signal field portion, information on a resource allocation for the device, the resource allocation indicating at least one resource unit (RU) used for a data field portion of the PPDU for the device; and
   decode the data field portion of the PPDU, the data field portion received on a part of the punctured subchannel based on the resource allocation, wherein the data field portion received on a part of the punctured subchannel is decoded based on the at least one signal field portion received on the at least one unpunctured subchannel.

2. The device of claim 1, wherein the PPDU is a Multi-User Multiple-Input Multiple-Output (MU-MIMO) PPDU, and the signal field includes a High Efficiency Signal B field (HE-SIG-B).

3. The device of claim 2, wherein the PPDU includes a Legacy Short Training field (L-STF), a Legacy Long Training Field (L-LTF) following the L-STF in a time domain, a Legacy Signal field (L-SIG) following the L-LTF in the time domain, and a High Efficiency Signal A field (HE-SIG-A) following the L-SIG and preceding the HE-SIG-B in the time domain, and wherein the processing circuitry is to decode the L-STF, the L-LTF, the L-SIG, and the HE-SIG-A.

4. The device of claim 3, wherein:
   the L-STF, L-LTF, L-SIG, HE-SIG-A and HE-SIG-B are part of a preamble portion of the PPDU, the preamble portion further including a High Efficiency Short Training field (HE-STF), and a High Efficiency Long Training field (HE-LTF) following the HE-STF and preceding the data field in the time domain, the HE-STF including HE-STF sub-portions, the HE-LTF including HE-LTF sub-portions, and the HE-SIG-B including HE-SIG-B sub-portions corresponding to the at least one signal field portion;
   the data field portion includes data sub-portions;
   each of the HE-STF sub-portions, the HE-LTF sub-portions and the data sub-portions occupies a bandwidth that is less than a bandwidth occupied by one of the HE-SIG-B sub-portions;
   and the processing circuitry is to decode an HE-STF sub-portion, an HE-LTF sub-portion, and the data sub-portion that occupy the part of the punctured subchannel.

5. The device of claim 1, wherein:
   the bonded channel has a bandwidth of one of 80 MHz or 160 MHz; and
   the subchannels each have a bandwidth of 20 MHz.

6. The device of claim 1, further including circuitry to:
   determine an energy level present over a frequency range corresponding to a first portion of the punctured subchannel; and
   determine whether the frequency range corresponding to the first portion of the punctured subchannel is busy or idle based on the determined energy level.

7. The device of claim 6, wherein the circuitry to determine the energy level is to determine the energy level present over the frequency range corresponding to the first portion of the punctured subchannel by subtracting an energy level present over a frequency range corresponding to a second portion of the punctured subchannel from an energy level over a frequency range corresponding to the entire punctured subchannel.

8. The device of claim 6, wherein the circuitry to determine the energy level includes a bandpass filter to filter out an energy level present over a frequency range corresponding to a second portion of the punctured subchannel to determine the energy level present over the frequency range corresponding to the first portion of the punctured sub channel.

9. The device of claim 1, further including a radio integrated circuit coupled to the processing circuitry, and a front-end module coupled to the radio integrated circuit.

10. The device of claim 9, further including a plurality of antennas coupled to the front-end module.

11. A method to be performed at a wireless communication device that includes a memory and a processing circuitry coupled to the memory, the method including:
    decoding, by the processing circuitry, at least one signal field portion of a signal field of a Physical Layer Convergence Protocol (PLCP) Data Unit (PPDU) received over a bonded channel, the bonded channel comprising a plurality of subchannels including a punctured subchannel, the at least one signal field portion received on at least one unpunctured subchannel of the plurality of subchannels, wherein the at least one signal field portion is not duplicated over the punctured subchannels;

determining, from the at least one signal field portion, information on a resource allocation for the device, the resource allocation indicating at least one resource unit (RU) used for a data field portion of the PPDU for the device; and decoding the data field portion of the PPDU, the data field portion received on a part of the punctured subchannel based on the resource allocation, wherein the data field portion received on a part of the punctured subchannel is decoded based on the at least one signal field portion received on the at least one unpunctured subchannel.

12. The method of claim 11, wherein the PPDU is a Multi-User Multiple-Input Multiple-Output (MU-MIMO) PPDU, and the signal field includes a High Efficiency Signal B field (HE-SIG-B).

13. The method of claim 12, wherein the PPDU includes a Legacy Short Training field (L-STF), a Legacy Long Training Field (L-LTF) following the L-STF in a time domain, a Legacy Signal field (L-SIG) following the L-LTF in the time domain, and a High Efficiency Signal A field (HE-SIG-A) following the L-SIG and preceding the HE-SIG-B in the time domain, and wherein the processing circuitry is to decode the L-STF, the L-LTF, the L-SIG, and the HE-SIG-A.

14. The method of claim 12, further comprising:
determining an energy level present over a frequency range corresponding to a first portion of the punctured subchannel; and
determining whether the frequency range corresponding to the first portion of the punctured subchannel is busy or idle based on the determined energy level.

15. The method of claim 14, further comprising determining the energy level present over the frequency range corresponding to the first portion of the punctured subchannel by subtracting an energy level present over a frequency range corresponding to a second portion of the punctured subchannel from an energy level over a frequency range corresponding to the entire punctured subchannel.

16. The method of claim 14, further comprising filtering out an energy level present over a frequency range corresponding to a second portion of the punctured subchannel to determine the energy level present over the frequency range corresponding to the first portion of the punctured subchannel.

17. A wireless communication device that includes a memory and a processing circuitry coupled to the memory, the device including:

means for decoding at least one signal field portion of a signal field of a Physical Layer Convergence Protocol (PLCP) Data Unit (PPDU) received over a bonded channel, the bonded channel comprising a plurality of subchannels including a punctured subchannel, the at least one signal field portion received on at least one unpunctured subchannel of the plurality of subchannels, wherein the at least one signal field portion is not duplicated over the punctured subchannels;

means for determining, from the at least one signal field portion, information on a resource allocation for the device, the resource allocation indicating at least one resource unit (RU) used for a data field portion of the PPDU for the device; and means for decoding the data field portion of the PPDU, the data field portion received on a part of the punctured subchannel based on the resource allocation, wherein the data field portion received on a part of the punctured subchannel is decoded based on the at least one signal field portion received on the at least one unpunctured subchannel.

18. The device of claim 17, further comprising:

means for determining an energy level present over a frequency range corresponding to a first portion of the punctured subchannel; and means for determining whether the frequency range corresponding to the first portion of the punctured subchannel is busy or idle based on the determined energy level.

19. The device of claim 18, further comprising means for determining the energy level present over the frequency range corresponding to the first portion of the punctured subchannel by subtracting an energy level present over a frequency range corresponding to a second portion of the punctured subchannel from an energy level over a frequency range corresponding to the entire punctured subchannel.

* * * * *